United States Patent [19]

Ishizuka et al.

[11] Patent Number: 4,608,301
[45] Date of Patent: Aug. 26, 1986

[54] RADIOGRAPHIC INTENSIFYING SCREEN

[75] Inventors: Akio Ishizuka, Fujinomiya; Hisashi Yamazaki; Kikuo Yamazaki, both of Kaisei, all of Japan

[73] Assignee: Fuji Photo Film Co., Ltd., Japan

[21] Appl. No.: 636,595

[22] Filed: Aug. 1, 1984

[30] Foreign Application Priority Data

Aug. 2, 1983 [JP] Japan ................... 58-141457
Jul. 31, 1984 [JP] Japan ................... 59-163363

[51] Int. Cl.⁴ .................. B32B 5/16; B32B 27/06; H01J 1/68
[52] U.S. Cl. .................. 428/328; 428/330; 428/424.2; 428/423.7; 428/483; 428/690; 428/913; 428/412; 428/463; 428/476.3; 428/473.5; 428/514; 250/483.1; 250/486.1
[58] Field of Search .............. 428/328, 330, 690, 913, 428/483, 423.7, 424.2; 250/486.1, 483.1

[56] References Cited

U.S. PATENT DOCUMENTS 2,676,112  4/1954  Middleton et al. ............. 428/690 X
4,486,486 12/1984  Maeoka et al. ................. 428/690 X
4,501,796  2/1985  Kitada ............................. 428/690 X
4,508,636  4/1985  Ochiai ............................. 428/690 X Primary Examiner—P. C. Ives
Attorney, Agent, or Firm—Gerald J. Ferguson, Jr.; Michael P. Hoffman; James E. Bryan

[57] ABSTRACT

A radiographic intensifying screen comprising a support and a phosphor layer provided thereon which comprises a binder and a phosphor dispersed therein, characterized in that said binder contains a (meth)acrylic copolymer in the amount of 5–100% by weight, having repeating units represented by the formulas (I), (II) and (III):

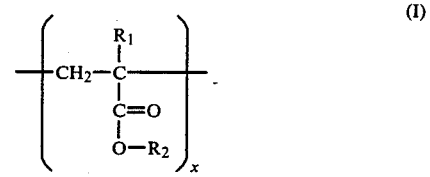

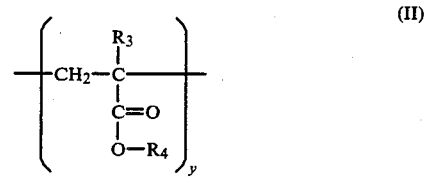

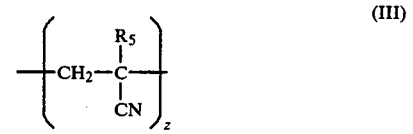

in which each of $R_1$, $R_3$ and $R_5$ is independently a hydrogen atom or an alkyl group; $R_2$ is a group selected from those consisting of an alkyl group, a cycloalkyl group, an aryl group, a heterocyclic group and an aralkyl group; $R_4$ is a hydrogen atom or an alkyl group, provided that $R_4$ is not identical to $R_2$; and x, y and z which represent molar percents are numbers satisfying the conditions of $5 \leq x \leq 99$, $1 \leq y+z \leq 95$ and $x+y+z \geq 90$. The (meth)acrylic copolymer is preferably employed in combination with a linear polyester having a hydroxyl value in the range of 20–70.

10 Claims, No Drawings

RADIOGRAPHIC INTENSIFYING SCREEN

BACKGROUND OF THE INVENTION

1. Field of the Invention

This invention relates to a radiographic intensifying screen and more particularly, to a radiographic intensifying screen comprising a support and a phosphor layer provided thereon which comprises a binder and a phosphor dispersed therein, and optionally a protective film provided on the phosphor layer.

2. Description of Prior Arts

In a variety of radiography such as medical radiography for diagnosis and industrial radiography for nondestructive inspection, a radiographic intensifying screen is generally employed in close contact with one or both surfaces of a radiographic film such as an X-ray film for enhancing the radiographic speed of the system. The radiographic intensifying screen consists essentially of a support and a phosphor layer provided thereon. Further, a transparent film is generally provided on the free surface of the phosphor layer (a surface not facing the support) to keep the phosphor layer from chemical deterioration and physical shocks.

The phosphor layer comprises a binder and phosphor particles dispersed therein. When excited with a radiation such as X-rays having passing through an object, the phosphor particles emit light of high luminance (spontaneous emission) in proportion to the dose of the radiation. Accordingly, the radiographic film placed in close contact with the phosphor layer can be exposed sufficiently to form a radiation image of the object, even if the radiation is applied to the object at a relatively small dose.

It is desired for a radiographic intensifying screen to exhibit a high radiographic speed and to provide an image of high quality (i.e., high sharpness, high graininess, etc.). There has been conventionally proposed a variety of intensifying screens improved in the radiographic speed or the quality of the image provided thereby.

The sharpness of the image in the radiography substantially depends on the spread of the emitted light within the radiographic intensifying screen. The sharpness of the image provided by the intensifying screen is generally enhanced by making the thickness of phosphor layer smaller, but in this case the radiographic speed thereof is apt to decrease. Therefore, for attaining the enhancement of sharpness of the image without decreasing the radiographic speed, it is desired that the mixing ratio between the binder and the phosphor (binder/phosphor) in the phosphor layer is made smaller so as to give a phosphor layer containing the phosphor in a large amount.

The radiographic intensifying screen hardly deteriorates upon exposure to a radiation, the intensifying screen can be repeatedly employed for a long period of time. Accordingly the intensifying screen is also required to have a sufficient mechanical strength so as not to allow easy separation of the phosphor layer from the support (and from the protective film in the case that the protective film is provided on the phosphor layer), when mechanical shocks and mechanical force caused by falling or bending are applied to the screen in the use.

However, the radiographic intensifying screen has a tendency that the bonding strength between the phosphor layer and support as well as that between the phosphor layer and protective film decreases as the mixing ratio of the binder to the phosphor in the phosphor layer decreases, in other words, as the amount of the phosphor contained therein increases.

For instance, it has been heretofore proposed to employ cellulose derivatives as a binder of phosphor layer of the radiographic intensifying screen from the viewpoint of dispersibility of the phosphor in the binder solution (i.e., coating solution), but in this case the obtained intensifying screen has not the mechanical strength enough for preventing easy separation of the phosphor layer from the support. It has been also proposed to employ a polyester resin as the binder of the phosphor layer from the viewpoint of resistance to flexing and adhesion thereof to the support, but in this case it is difficult to obtain a phosphor layer containing a phosphor in a large amount.

Further, in the case that a phosphor layer is formed on a support by a conventional coating procedure using the above-mentioned binders, the phosphor particles are apt to separate from the binder in the drying procedure of the phosphor layer, because the binders have poor affinity for the phosphor. As a result, the relatively large amount of phosphor particles gather on the support side of the phosphor layer, and accordingly, the phosphor particles are present in a relatively small amount on the screen surface side of the phosphor layer (or the protective film side, that is, the side which is in contact with a radiographic film) so as to produce so-called "gathering on surface" of binder. In such radiographic intensifying screen, especially when the phosphor layer contains the phosphor in a large amount, the phosphor particles aggregate on the support side of the phosphor layer, whereby the enough bonding strength between the phosphor layer and support cannot be obtained. In addition, the light emitted by the phosphor easily spread on the screen surface side of the phosphor layer because of the gathering on surface of the binder, so that the quality of the image tends to deteriorate.

On the other hand, in order to enhance the bonding strength between the phosphor layer and protective film in the radiographic intensifying screen comprising a support, phosphor layer and protective film, it has been proposed to employ the known acrylic resin such as a polyalkyl methacrylate as the binder of the phosphor layer, but there is a tendency that the cracks are produced in the phosphor layer when the mechanical shock such as bending is given to the screen.

SUMMARY OF THE INVENTION

It is a primary object of the present invention to provide a radiographic intensifying screen having characteristics to give an image of high sharpness as well as high mechanical strength, especially, high bonding strength between the support and the phosphor layer.

It is another object of the present invention to provide a radiographic intensifying screen having high mechanical strength, especially, high bonding strength between the protective film and the phosphor layer and high resistance to bending action, as well as the characteristics to give an image of high sharpness.

The present invention provides a radiographic intensifying screen comprising a support and a phosphor layer provided thereon which comprises a binder and a phosphor dispersed therein, characterized in that said binder contains a (meth)acrylic copolymer in the amount of 5-100% by weight, having repeating units represented by the formulas (I), (II) and (III):

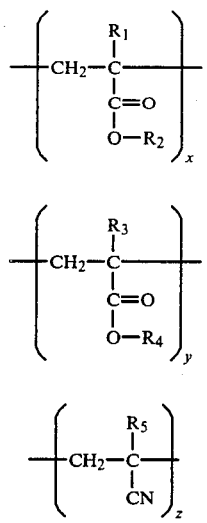

in which each of $R_1$, $R_3$ and $R_5$ is independently a hydrogen atom or an alkyl group; $R_2$ is a group selected from those consisting of an alkyl group, a cycloalkyl group, an aryl group, a heterocyclic group and an aralkyl group; $R_4$ is a hydrogen atom or an alkyl group, provided that $R_4$ is not identical to $R_2$; and x, y and z which represent molar percents are numbers satisfying the conditions of $5 \leq x \leq 99$, $1 \leq y + z \leq 95$ and $x + y + z \geq 90$.

The present invention further provides a radiographic intensifying screen comprising a support, a phosphor layer which comprises a binder and a phosphor dispersed therein, and a protective film, superposed in this order, characterized in that said binder contains a mixture of the above-mentioned (meth)acrylic copolymer having repeating units represented by the above-mentioned formulas (I), (II) and (III) and a linear polyester having a hydroxyl value in the range of 20–70 whose content is not more than 40% by weight of said mixture, in the amount of 60–100% by weight.

DETAILED DESCRIPTION OF THE INVENTION

In the radiographic intensifying screen of the present invention, both the sharpness of an image provided thereby and the mechanical strength thereof are enhanced by employing a specific (meth)acrylic copolymer as a binder of a phosphor layer of the intensifying screen.

The (meth)acrylic copolymer employable in the present invention has a specific high affinity for phosphor particles. Accordingly, a relatively large amount of the phosphor can be incorporated into the phosphor layer employing the (meth)acrylic copolymer as a binder. Since the gathering on surface of a binder hardly occurs in the phosphor layer containing the phosphor in a large amount in the case that the above-identified (meth)acrylic copolymer is employed as the binder, the bonding strength between the phosphor layer and support well increases. Further, the (meth)acrylic copolymer employed in the invention is so flexible that the radiographic intensifying screen shows the high resistance to bending (i.e., high flexing resistance) and accordingly is improved in the mechanical strength against the mechanical shocks, bending or the like.

The incorporation of the large amount of phosphor into the phosphor layer of the radiographic intensifying screen can bring about high sharpness of the image provided thereby without decreasing the radiographic speed of the screen to a low level. In addition, since the gathering on surface of binder hardly occurs in the phosphor layer, the sharpness of the image provided by the intensifying screen of the present invention is prominently enhanced as compared with the conventional intensifying screen, even if the mixing ratio between the binder and phosphor is set to the same level as that of the conventional screen.

Moreover, the radiographic intensifying screen of the present invention is improved in both the bonding strength between the phosphor layer and protective film and the resistance to flexing as well as the sharpness of the image provided thereby, by employing the above-mentioned (meth)acrylic copolymer in combination with a linear polyester having a specific hydroxyl value as the binder of the phosphor layer.

More in detail, the (meth)acrylic copolymer generally has poor compatibility with a normal polyester resin and it has been considered that both resins are hardly employed in combination. However, it has been discovered by the present inventors that the above-mentioned (meth)acrylic copolymer can be employed together with a polyester resin as the binder when the polyester resin is a linear polyester having a hydroxyl value in the range of 20–70. The radiographic intensifying screen in which the binder of phosphor layer comprises a mixture of the above-mentioned (meth)acrylic copolymer having the high affinity for phosphor particles and the linear polyester having the good flexibility provides an image of high quality and shows a high mechanical strength. In particular, it is generally desired that the bonding strength between the phosphor layer and protective film is not less than 90 g./cm (peel strength, peel angle: 90°), and such peel strength is satisfactorily given to the intensifying screen of the present invention. Accordingly, the intensifying screen containing the mixture of the (meth)acrylic copolymer and linear polyester as the binder shows the high bonding strength between the phosphor layer and protective film as well as that between the phosphor layer and support, and the higher resistance to bending with no decrease of the sharpness of the image.

The radiographic intensifying screen of the present invention having the advantageous characteristics as described above can be prepared, for instance, in the following manner.

The phosphor layer basically comprises a binder and phosphor particles dispersed therein.

The binder, that is a characteristic requisite of the present invention, is a (meth)acrylic copolymer having repeating units represented by the formulas (I), (II) and (III):

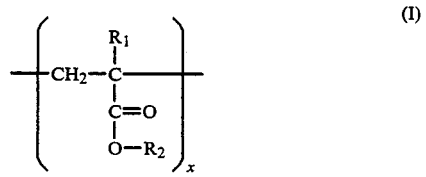

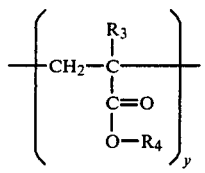

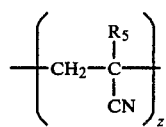

in which each of $R_1$, $R_3$ and $R_5$ is independently a hydrogen atom or an alkyl group; $R_2$ is a group selected from those consisting of an alkyl group, a cycloalkyl group, an aryl group, a heterocyclic group and an aralkyl group; $R_4$ is a hydrogen atom or an alkyl group, provided that $R_4$ is not identical to $R_2$; and x, y and z which represent molar percents are numbers satisfying the conditions of $5 \leq x \leq 99$, $1 \leq y+z \leq 95$ and $x+y+z \geq 90$.

In the formulas (I), (II) and (III), each of $R_1$, $R_3$ and $R_5$ is a hydrogen atom or an alkyl group, and preferably a hydrogen atom or an alkyl group having 1–6 carbon atoms such as methyl, ethyl, propyl or butyl.

$R_2$ is preferably any one of an alkyl group having 1–20 carbon atoms such as methyl, ethyl, propyl, butyl or hexyl; a cycloalkyl group having 5–12 carbon atoms such as cyclopentyl or cyclohexyl; an aryl group such as phenyl; a heterocyclic group such as pyrizyl; and an aralkyl group having 7–20 carbon atoms such as benzyl, phenylethyl, phenylpropyl, phenylbutyl or naphthylmethyl.

$R_4$ is a hydrogen atom or an alkyl group, and preferably a hydrogen atom or an alkyl group having 1–6 carbon atoms such as methyl, ethyl, propyl, butyl or hexyl, provided that $R_4$ is not equal to $R_2$.

From the viewpoint of the affinity for phosphor particles and the hardness of the resulting layer, the (meth)acrylic copolymer preferably employable for the binder of the radiographic intensifying screen of the present invention has the above-mentioned formulas (I), (II) and (III), in which x, y and z are numbers satisfying the conditions of $50 \leq x \leq 95$, $5 \leq y+z \leq 50$, and $x+y+z \geq 95$. Otherwise, x, y and z may be numbers satisfying the conditions of $70 \leq x \leq 95$, $y=0$, $5 \leq z \leq 30$, and $x+y+z \geq 95$, and particularly preferable is $x+y+z=100$.

In the case that the sum of x, y and z is a number less than 100 ($x+y+z<100$) in the formulas, the (meth)acrylic copolymer contains one or more additional repeating unit. Examples of the additional repeating unit include an aliphatic alkylene, styrene, a vinyl derivative and a divalent group derived from acrlylamide.

The (meth)acrylic copolymer having the repeating units represented by the above-mentioned formulas (I), (II) and (III) which is employable in the present invention can be prepared by known copolymerization reaction using a variety of monomers capable of giving such repeating units, for example, an acrylic acid, acrylic acid ester, methacrylic acid, methacrylic acid ester, acrylonitrile and methacrylonitrile, and other monomers copolymerizable with these monomers, if desired.

The (meth)acrylic copolymer employed in the present invention may be crosslinked with a crosslinking agent. Examples of the crosslinking agent include an aliphatic polyisocyanate and an aromatic polyisocyanate.

The (meth)acrylic copolymer is contained in the binder of the phosphor layer in the amount of 5–100% by weight. From the viewpoint of the dispersibility of phosphor particles in the binder solution, easiness of uniform coating and hardness of layer to be formed, the binder of the phosphor layer preferably contains the (meth)acrylic copolymer in the amount of 40–90% by weight, the remainder being one or more other binder components.

Examples of the other binder component employable in combination with the (meth)acrylic copolymer in the present invention include synthetic polymers such as polyester, polyurethane, polyisocyanate, cellulose derivatives, polyalkyl methacrylate, cellulosic resins, amino resins and melamine resins. Among these binder components, preferred are polyester, nitrocellulose, polyalkyl methacrylate, and a mixture of nitrocellulose and polyisocyanate.

Specifically, a linear polyester is preferably employed in combination with the (meth)acrylic copolymer.

The linear polyester preferably employed in the present invention has a hydroxyl value in the range of 20–70 mg.KOH/g, and preferably is a saturated linear polyester having a low molecular weight in the range of $3 \times 10^3 - 10^4$.

The linear polyester can be obtained by polycondensation reaction of a dihydroxyl compound (e.g., ethylene glycol, 1,3-propanediol, 1,4-butanediol, or 1,4-cyclohexane dimethanol) and a dibasic acid (e.g., succinic acid, glutaric acid, adipic acid, terephthalic acid, or isophthalic acid), and the saturated linear polyester having a hydroxyl value of 20–70 mg.KOH/g can be obtained by adjusting the molar ratio of the starting materials and/or reaction conditions, etc. Otherwise, the linear polyester can be obtained by polycondensation reaction of an oxy acid such as glycolic acid, lactic acid, malic acid, tartaric acid, citric acid, salicylic acid, benzoic acid, gallic acid, mandelic acid, or tropic acid.

The linear polyester is employed in the content of not more than 40% by weight, preferably 10–40% by weight, of the mixture thereof in combination with the above-mentioned (meth)acrylic copolymer.

The mixture of the (meth)acrylic copolymer and linear polyester can be contained in the binder of the phosphor layer in the amount of 60–100% by weight. From the viewpoint of the dispersibility of the phosphor particles in the binder solution, easiness of uniform coating and hardness of the layer to be formed, the binder of the phosphor layer preferably contains this mixture in the amount of 75–95% by weight, the remainder being one or more other binder component.

As for the other binder component employable in combination with the mixture of the (meth)acrylic copolymer and linear polyester in the present invention, the aforementioned binder components can be employed. More concretely, there can be mentioned polyester (e.g., Vylon 530; available from Toyobo Co., Ltd.), polyurethane (e.g., Desmocoll 400 and Desmolac KL-5-2625; available from Sumitomo Bayer Urethane Co., Ltd.), vinyl acetate resin (e.g., Denka ASR CL-13; available from Denki Kagaku Kogyo K. K.), styrene resin (e.g., Piccolastic A-75; available from Esso Standard Oil Co.), polyisocyanate, cellulose derivatives, polyalkylmethacrylate (e.g., Almatex; available from Mitsui Toatsu Chemicals, Inc.), cellulosic resins, amino resins and melamine resins. Among these binder components, preferred are nitrocellulose and polyalkyl methacrylate.

A variety of phosphors employable for a radiographic intensifying screen have been known, and any one of them can be used in the present invention. Examples of the phosphor preferably employable in the present invention include:

tungstate phosphors such as $CaWO_4$, $MgWO_4$, and $CaWO_4$:Pb;

terbium activated rare earth oxysulfide phosphors such as $Y_2O_2S$:Tb, $Gd_2O_2S$:Tb, $La_2O_2S$:Tb, $(Y,Gd)_2O_2S$:Tb, and $(Y,Gd)_2O_2S$:Tb,Tm;

terbium activated rare earth phosphate phosphors such as $YPO_4$:Tb, $GdPO_4$:Tb and $LaPO_4$:Tb;

terbium activated rare earth oxyhalide phosphors such as LaOBr:Tb, LaOBr:Tb,Tm, LaOCl:Tb, LaOCl:Tb,Tm, GdOBr:Tb, and GdOCl:Tb;

thulium activated rare earth oxyhalide phosphors such as LaOBr:Tm and LaOCl:Tm;

barium sulfate phosphors such as $BaSO_4$:Pb, $BaSO_4$:$Eu^{2+}$, and $(Ba,Sr)SO_4$:$Eu^{2+}$;

divalent europium activated alkaline earth metal phosphate phosphors such as $Ba_3(PO_4)_2$:$EU^{2+}$ and $(Ba,Sr)_3(PO_4)_2$:$Eu^{2+}$;

divalent europium activated alkaline earth metal fluorohalide phosphors such as $BaFCl$:$Eu^{2+}$, $BaFBr$:$Eu^{2+}$, $BaFCl$:$Eu^{2+}$,Tb, $BaFBr$:$Eu^{2+}$,Tb, $BaF_2 \cdot BaCl_2 \cdot KCl$:$Eu^{2+}$, $BaF_2 \cdot BaCl_2 \cdot xBaSO_4 \cdot KCl$:$Eu^{2+}$, and $(Ba,Mg)F_2 \cdot BaCl_2 \cdot KCl$:$Eu^{2+}$;

iodide phosphors such as CsI:Na, CsI:Tl, NaI:Tl, and KI:Tl;

sulfide phosphors such as ZnS:Ag, (Zn,Cd)S:Ag, (Zn,Cd)S:Cu, and (Zn,Cd)S:Cu,Al; and hafnium phosphate phosphors such as $HfP_2O_7$:Cu.

The above-described phosphors are given by no means to restrict the phosphor employable in the present invention. Any other phosphors can also be employed, provided that the phosphor emits light having a wavelength within near ultraviolet to visible region when exposed to a radiation such as X-rays.

The phosphor layer can be formed on the support, for instance, by the following procedure.

In the first place, phosphor particles and a binder are added to an appropriate solvent, and then they are mixed to prepare a coating dispersion of the phosphor particles homogeneously dispersed in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The mixing ratio of the binder to the phosphor in the coating dispersion can be determined according to the characteristics of the radiographic intensifying screen under preparation and the nature of the phosphor employed therein. Generally, the ratio is within the range of from 1:1 to 1:100 (binder:phosphor, by weight), preferably from 1:8 to 1:50.

The coating dispersion may contain a dispersing agent to improve the dispersibility of the phosphor particles therein, and may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly onto the surface of a support to form a layer of the coating dispersion. The coating procedure can be carried out by a conventional method such as a method using a doctor blade, a roll coater or a knife coater.

After applying the coating dispersion onto the support, the coating dispersion is then heated slowly to dryness so as to complete the formation of the phosphor layer. The thickness of the phosphor layer varies depending upon the characteristics of the radiographic intensifying screen under preparation, the nature of the phosphor, the ratio of the binder to the phosphor, etc. In general, the thickness of the phosphor layer is within a range of from 20 $\mu$m to 1 mm, and preferably within a range of from 50 to 500 $\mu$m.

The phosphor layer can be provided onto the support by the methods other than that given in the above. For instance, the phosphor layer is initially prepared on a sheet material (false support) such as a glass plate, a metal plate or a plastic sheet using the aforementioned coating dispersion and then thus prepared phosphor layer is superposed on the genuine support by pressing or using an adhesive agent.

The support material employed in the present invention can be selected from those employable for the radiogaphic intensifying screens in the radiography. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. Among these materials, a plastic film is preferably employed as the support material of the invention. The plastic film may contain a light-absorbing material such as carbon black, or may contain a light-reflecting material such as titanium dioxide. The former is appropriate for preparing a high-sharpness type radiographic intensifying screen, while the latter is appropriate for preparing a high-speed type radiographic intensifying screen.

In the preparation of a known radiographic intensifying screen, one or more additional layers are occasionally provided between the support and the phosphor layer so as to enhance the bonding strength between the support and the phosphor layer, or to improve the radiographic speed of the screen or the quality of an image provided thereby. For instance, a subbing layer or an adhesive layer may be provided by coating polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In radiographic intensifying screens employed in the industrial radiography for non-destructive inspection, a metal foil is optionally provided on the phosphor layer side surface of the support, so as to remove scattered radiation. Such a metal foil is chosen from lead foil, lead alloy foil, tin foil and the like. In the invention, one or more of these additional layers may be provided on the support.

As described in Japanese Patent Provisional Publication No. 58(1983)-182599, the phosphor layer side surface of the support (or the surface of an adhesive layer, light-reflecting layer, light-absorbing layer or metal foil in the case where such layers provided on the phosphor layer) may be provided with protruded and depressed portions for enhancement of sharpness of the image.

On the surface of the phosphor layer, a transparent protective film is preferably provided to protect the phosphor layer from physical and chemical deterioration.

The protective film can be provided onto the phosphor layer by coating the surface of the phosphor layer with a solution of a transparent polymer such as a cellulose derivative (e.g., cellulose acetate or nitrocellulose), or a synthetic polymer (e.g., polymethyl methacrylate, polyvinyl butyral, polyvinyl formal, polycarbonate, polyvinyl acetate, or vinyl chloride-vinyl acetate copolymer), and drying the coated solution. Alternatively, the protective film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within a range of approx. 3 to 20 μm.

The following examples will illustrate the present invention, but these examples are by no means to restrict the invention. In the following examples, the term of "part" means "part by weight", unless otherwise specified.

EXAMPLE 1

To a mixture of a particulate tungstate phosphor (CaWO₄) and an acrylic copolymer (trade name: Criscoat P-1018GS, available from Dainippon Ink & Chemicals Inc., Japan) having the following repeating units;

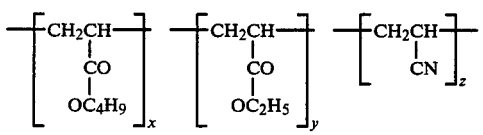

(in which x=60, y=30, and z=10) was added methyl ethyl ketone, and the mixture was sufficiently stirred by means of a propeller agitater to prepare a homogeneous coating dispersion having a mixing ratio of 1:20 (binder:phosphor, by weight) and a viscosity of 25–35 PS (at 25° C.).

| Composition of Coating Dispersion | |
|---|---|
| CaWO₄ phosphor | 500 parts |
| Acrylic copolymer | 25 parts |
| Methyl ethyl ketone | 105 parts |

Then the coating dispersion was evenly applied onto a polyethylene terephthalate film containing carbon black (support, thickness: 250 μm) placed horizontally on a glass plate. The application of the coating dispersion was carried out using a doctor blade. After the coating was complete, the support having a layer of the coating dispersion was heated to dryness for 10 min. under air stream at 90° C. and at a flow rate of 1.0 m/sec. Thus, a phosphor layer having the thickness of approx. 180 μm was formed on the support.

On the phosphor layer was placed a polyethylene terephthalate transparent film (thickness: 12 μm; provided with a polyester adhesive layer on one surface) to combine the film and the phosphor layer with the adhesive layer. Thus, a radiographic intensifying screen consisting essentially of a support, a phosphor layer, and a transparent protective film was prepared.

EXAMPLE 2

A radiographic intensifying screen consisting essentially of a support, a phosphor layer and a transparent protective film was prepared in the same manner as described in Example 1, except that aliphatic polyisocyanate (crosslinking agent; trade name: Sumidul N, available from Sumitomo Bayer Urethane Co., Ltd., Japan), nitrocellulose (binder) and tricresyl phosphate (plasticizer) were added to the coating dispersion of Example 1, to prepare a coating dispersion having the following composition.

| Composition of Coating Dispersion | |
|---|---|
| CaWO₄ phosphor | 500 parts |
| Acrylic copolymer | 20 parts |
| Polyisocyanate | 1.9 parts |
| Nitrocellulose | 2.5 parts |
| Tricresyl phosphate | 0.6 part |
| Methyl ethyl ketone | 110 parts |

EXAMPLE 3

A radiographic intensifying screen consisting essentially of a support, a phosphor layer and a transparent protective film was prepared in the same manner as described in Example 1, except that aliphatic polyisocyanate (crosslinking agent; trade name: Sumidul N, available from Sumitomo Bayer Urethane Co., Ltd., Japan), polymethyl methacrylate (binder; trade name: BR-107, available from Mitsubishi Rayon Co., Ltd., Japan), nitrocellulose (binder) and tricresyl phosphate (plasticizer) were added to the coating dispersion of Example 1, to prepare a coating dispersion having the following composition.

| Composition of Coating Dispersion | |
|---|---|
| CaWO₄ phosphor | 500 parts |
| Acrylic copolymer | 15 parts |
| Polyisocyanate | 1.9 parts |
| Polymethyl methacrylate | 5.0 parts |
| Nitrocellulose | 2.5 parts |
| Tricresyl phosphate | 0.6 part |

-continued

| Composition of Coating Dispersion | |
| --- | --- |
| Methyl ethyl ketone | 110 parts |

COMPARISON EXAMPLE 1

A radiographic intensifying screen consisting essentially of a support, a phosphor layer and a transparent protective film was prepared in the same manner as described in Example 1, except that a linear polyester (trade name: Vylon 500, available by Toyobo Co., Ltd., Japan) having a hydroxyl value of 7–10 mg.KOH/g, and a molecular weight of $2 \times 10^4$–$2.5 \times 10^4$ and nitrocellulose were employed as a binder instead of the acrylic copolymer, and that tolylene isocyanate (crosslinking agent), tricresyl phosphate (plasticizer) and n-butanol (solvent) were added to the coating dispersion of Example 1, to prepare a coating dispersion having the following composition.

| Composition of Coating Dispersion | |
| --- | --- |
| $CaWO_4$ phosphor | 500 parts |
| Linear polyester | 22.5 parts |
| Tolylene isocyanate | 0.6 part |
| Nitrocellulose | 2.5 parts |
| Tricresyl phosphate | 0.3 part |
| n-Butanol | 5.7 parts |
| Methyl ethyl ketone | 100 parts |

A radiographic intensifying screen consisting essentially of a support, a phosphor layer and a transparent protective film was prepared in the same manner as described in Comparison Example 1, except for using a coating dispersion of the following composition in which the mixing ratio was adjusted to 1:10 (binder:-phosphor, by weight).

| Composition of Coating Dispersion | |
| --- | --- |
| $CaWO_4$ phosphor | 500 parts |
| Linear polyester | 45 parts |
| Tolylene isocyanate | 1.3 parts |
| Nitrocellulose | 5.0 parts |
| Tricresyl phosphate | 0.5 part |
| n-Butanol | 5.7 parts |
| Methyl ethyl ketone | 75 parts |

COMPARISON EXAMPLE 3

A radiographic intensifying screen consisting essentially of a support, a phosphor layer and a transparent protective film was prepared in the same manner as described in Example 1, except that nitrocellulose was employed as a binder instead of the acrylic copolymer and that tricresyl phosphate (plasticizer) and n-butanol (solvent) were added to the coating dispersion of Example 1, to prepare a coating dispersion having the following composition and the mixing ratio of 1:10 (binder:-phospher, by weight).

| Composition of the Coating Dispersion | |
| --- | --- |
| $CaWO_4$ phosphor | 500 parts |
| Nitrocellulose | 32 parts |
| Tricresyl phosphate | 0.5 part |
| n-Butanol | 5.7 parts |
| Methyl ethyl ketone | 75 parts |

The radiographic intensifying screens prepared in Examples 1 to 3 and Comparison Examples 1 to 3 were evaluated on the sharpness of the image provided thereby and the bonding strength between the phosphor layer and support according to the following test.

(1) Sharpness of image

The radiographic intensifying screen was combined with an X-ray film in a cassette, and exposed to X-rays at voltage of 80 KVp through an MTF chart. The film was then developed to obtain a visible image, and the modulation transfer function (MTF) value of the visible image was determined. The MTF value was given as a value (%) at the spatial frequency of 2 cycle/mm.

(2) Bonding strength between phosphor layer and support

The radiographic intensifying screen was cut to give a test strip (specimen) having a width of 10 mm, and the test strip was given a notch along the interface between the phosphor layer and the support. In a tensile testing machine (Tensilon UTM-II-20 manufactured by Toyo Balodwin Co., Ltd., Japan), the support part and the part consisting of the phosphor layer and protective film of the so notched test strip were forced to separate from each other by pulling one part from another part at rectangular direction (peel angle: 90°) at a rate of 10 mm/min. The bonding strength was determined just when a 10-mm long phosphor layer portion was peeled from the support. The strength (peel strength) is expressed in terms of the force F (g./cm).

The results of the evaluation on the radiographic intensifying screens are set forth in Table 1.

TABLE 1

| | B:P (by weight) | Bonding Strength (g./cm) | Sharpness (%) |
| --- | --- | --- | --- |
| Example 1 | 1:20 | 350 | 52 |
| Example 2 | 1:20 | 460 | 53 |
| Example 3 | 1:20 | 410 | 53 |
| Com. Example 1 | 1:20 | 150 | 50 |
| Com. Example 2 | 1:10 | 330 | 43 |
| Com. Example 3 | 1:10 | 50 | 45 |

Remarks: B: P means a mixing ratio by weight of the binder (B) to the phosphor (P).

As is evident from the results set forth in Table 1, the radiographic intensifying screens according to the present invention (Examples 1 to 3) were prominently enhanced in the bonding strength between the phosphor layer and support though the phosphor particles were contained in the phosphor layer in the large amount, and provided the images of remarkably high sharpness, as compared with the conventional radiographic intensifying screens (Comparison Examples 1 to 3).

EXAMPLE 4

A radiographic intensifying screen consisting essentially of a support, a phosphor layer and a transparent protective film was prepared in the same manner as described in Example 1, except that a mixture of an acrylic copolymer (trade name: Criscoat P-1018GS, available from Dainippon Ink & Chemicals Inc., Japan) having the following repeating units;

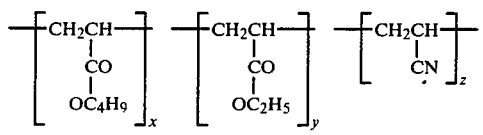

(in which x=60, y=30, and z=10) and a saturated linear polyester (trade name: Vylon GK-130, available from Toyobo Co., Ltd., Japan) having a hydroxyl value of 30–60 mg.KOH/g and a molecular weight of $5\times10^3$–$8\times10^3$, and nitrocellulose were employed as a binder instead of the acrylic copolymer and that tricresyl phosphate (plasticizer) was added to the coating dispersion of Example 1, to prepare a coating dispersion having the following composition.

| Composition of Coating Dispersion | |
|---|---|
| CaWO$_4$ phosphor | 500 parts |
| Acrylic copolymer | 13.8 parts |
| Saturated linear polyester | 8.8 parts |
| Nitrocellulose | 2.0 parts |
| Tricresyl phosphate | 0.5 part |
| Methyl ethyl ketone | 110 parts |

(the content of the saturated linear polyester in the mixture of the acrylic copolymer and linear polyester:39%)

EXAMPLE 5

A radiographic intensifying screen consisting essentially of a support, a phosphor layer and a transparent protective film was prepared in the same manner as described in Example 1, except that a mixture of an acrylic copolymer (trade name: Criscoat P-1018GS, available from Dainippon Ink & Chemicals Inc., Japan) and a saturated linear polyester (trade name: Vylon GK-130, available from Toyobo Co., Ltd., Japan), polymethyl methacrylate (trade name: BR-107, available by Mitsubishi Rayon Co., Ltd., Japan) and nitrocellulose were employed as a binder instead of the acrylic copolymer and that tricresyl phosphate (plasticizer) was added to the coating dispersion of Example 1, to prepare a coating dispersion having the following composition.

| Composition of Coating Dispersion | |
|---|---|
| CaWO$_4$ phosphor | 500 parts |
| Acrylic copolymer | 13.8 parts |
| Saturated linear polyester | 6.8 parts |
| Polymethyl methacrylate | 2.0 parts |
| Nitrocellulose | 2.0 parts |
| Tricresyl phosphate | 0.5 part |
| Methyl ethyl ketone | 110 parts |

(the content of the saturated linear polyester in the mixture of the acrylic copolymer and linear polyester:33%)

EXAMPLE 6

A radiographic intensifying screen consisting essentially of a support, a phosphor layer and a transparent protective film was prepared in the same manner as described in Example 1, except that polymethyl methacrylate (binder, trade name: BR-107, available from Mitsubishi Rayon Co., Ltd., Japan), nitrocellulose (binder) and tricresyl phosphate (plasticizer) were added to the coating dispersion of Example 1, to prepare a coating dispersion having the following composition.

| Composition of Coating Dispersion | |
|---|---|
| CaWO$_4$ phosphor | 500 parts |
| Acrylic copolymer | 13.8 parts |
| Polymethyl methacrylate | 8.8 parts |
| Nitrocellulose | 2.0 parts |
| Tricresyl phosphate | 0.5 part |
| Methyl ethyl ketone | 95 parts |

EXAMPLE 7

A radiographic intensifying screen consisting essentially of a support, a phosphor layer and a transparent protective film was prepared in the same manner as described in Example 6, except for using a coating dispersion of the following composition.

| Composition of Coating Dispersion | |
|---|---|
| CaWO$_4$ phosphor | 500 parts |
| Acrylic copolymer | 8.8 parts |
| Polymethyl methacrylate | 13.8 parts |
| Nitrocellulose | 2.0 parts |
| Tricresyl phosphate | 0.5 part |
| Methyl ethyl ketone | 95 parts |

COMPARISON EXAMPLE 4

A radiographic intensifying screen consisting essentially of a support, a phosphor layer and a transparent protective film was prepared in the same manner as described in Example 4, except for using a coating dispersion of the following composition.

| Composition of Coating Dispersion | |
|---|---|
| CaWO$_4$ phosphor | 500 parts |
| Acrylic copolymer | 8.8 parts |
| Saturated linear polyester | 13.8 parts |
| Nitrocellulose | 2.0 parts |
| Tricresyl phosphate | 0.5 part |
| Methyl ethyl ketone | 110 parts |

(the content of the saturated linear polyester in the mixture of the acrylic copolymer and linear polyester:61%)

The prepared coating dispersion was turbid owing to the poor compatibility between the acrylic copolymer and linear polyester.

The radiographic intensifying screens prepared in Examples 4 to 7 and Comparison Example 4 were evaluated on the resistance to bending (i.e., flexing resistance) and the bonding strength between the phosphor layer and protective film according to the following test, as well as on the above-mentioned sharpness of the image and the bonding strength between the phosphor layer and support.

(1) Flexing Resistance

The radiographic intensifying screen was cut to give a test strip (specimen) having a width of 100 mm and the test strip was wound round a variety of cylinders whose diameters range from 40 to 145 mm for a given period of time. The flexing resistance was evaluated through eye observation on the crack occurring in the phosphor layer of the test strip.

(2) Bonding strength between phosphor layer and protective film

The radiographic intensifying screen was cut to give a test strip (specimen) having a width of 10 mm and the test strip was given with a notch along the interface between the phosphor layer and the protective film.

The bonding strength between the phosphor layer and protective film was determined in the same manner as described for the bonding strength between the phosphor layer and support.

The results of the evaluation on the radiographic intensifying screens are set forth in Table 2.

TABLE 2

| | Bonding Strength (g./cm) | | Crack | Sharpness |
|---|---|---|---|---|
| | protective film | support | (cylinder) | (%) |
| Ex. 4 | 155–170 | 470 | Not occurred (40 mm) | 50 |
| Ex. 5 | 105–120 | 450 | Not occurred (40 mm) | 52 |
| Ex. 6 | 80–95 | 390 | Not occurred (40 mm) | 53 |
| Ex. 7 | 100–120 | 370 | Occurred (120 mm) | 52 |
| Com. Ex. 4 | 140–160 | 450 | Not occurred (40 mm) | 48 |

As is evident from the results set forth in Table 2, the radiographic intensifying screens according to the present invention in which the binder of the phosphor layer comprised the mixture of acrylic copolymer and saturated linear polyester (Examples 4 and 5) were enhanced in the bonding strength between the phosphor layer and protective film as well as that between the phosphor layer and support, as compared with another screen according to the present invention in which the binder comprised the acrylic copolymer (Example 6).

Further, the radiographic intensifying screens (Examples 4 and 5) were enhanced in the resistance to bending as well as the bonding strength between the phosphor layer and support, as compared with another screen according to the present invention (Example 7), and provided the images of high sharpness.

In contrast, although the radiographic intensifying screen (Comparison Example 4) showed the high bonding strength and the high resistance to bending, the compatibility of the binder components is poor and the gathering on surface of the binder was observed in the phosphor layer owing to the phase separation thereof, to decrease the sharpness of the image provided by the screen.

We claim:

1. A radiographic intensifying screen comprising a plastic film support and a phosphor layer provided thereon which comprises a binder and a phosphor dispersed therein, said binder containing a (meth)acrylic copolymer in the amount of 5–100% by weight, having repeating units represented by the formulas (I), (II) and (III):

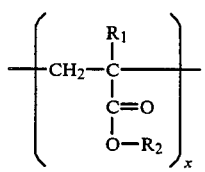

(I)

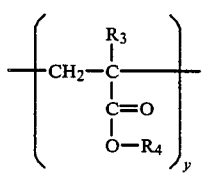

(II)

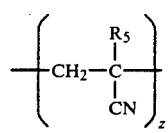

(III)

in which each of $R_1$, $R_3$ and $R_5$ is independently a hydrogen atom or an alkyl group; $R_2$ is a group selected from those consisting of an alkyl group, a cycloalkyl group, an aryl group, a heterocyclic group and an aralkyl group; $R_4$ is a hydrogn atom or an alkyl group, provided that $R_4$ is not identical to $R_2$; and x, y and z which represent molar percents are numbers satisfying the conditions of $5 \leq x \leq 99$, $1 \leq y+z \leq 95$ and $x+y+z \geq 90$.

2. The radiographic intensifying screen as claimed in claim 1, in which x, y and z in the formulas (I), (II) and (III) are numbers satisfying the conditions of $50 \leq x \leq 95$, $5 \leq y+z \leq 50$ and $x+y+z \geq 95$, and said binder contains the (meth)acrylic copolymer in the amount of 40–90% by weight.

3. The radiographic intensifying screen as claimed in claim 2, in which x, y and z in the formulas (I), (II) and (III) are numbers satisfying the conditions of $70 \leq x \leq 95$, $y = 0$, $5 \leq z \leq 30$ and $x+y+z \geq 95$.

4. The radiographic intensifying screen as claimed in claim 2, in which x, y and z in the formulas (I), (II) and (III) are numbers satisfying the conditions of $x+y+z = 100$.

5. The radiographic intensifying screen as claimed in claim 1, in which said (meth)acrylic copolymer is crosslinked with a crosslinking agent.

6. The radiographic intensifying screen as claimed in claim 5, in which said crosslinking agent is polyisocyanate.

7. A radiographic intensifying screen comprising a plastic film support, a phosphor layer which comprises a binder and a phosphor dispersed therein, and a protective film, superposed in this order, said binder containing a mixture of a (meth)acrylic copolymer having repeating units represented by the formulas (I), (II) and (III) and a linear polyester having a hydroxyl value in the range of 20–70 whose content is not more than 40% by weight of said mixture, in the amount of 60–100% by weight:

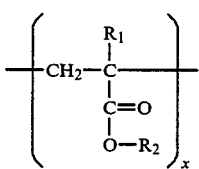

(I)

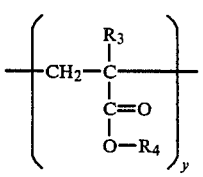

(II)

-continued

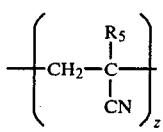
(III)

in which each of $R_1$, $R_3$ and $R_5$ is independently a hydrogen atom or an alkyl group; $R_2$ is a group selected from those consisting of an alkyl group, a cycloalkyl group, an aryl group, a heterocyclic group and an aralkyl group; $R_4$ is a hydrogen atom or an alkyl group, provided that $R_4$ is not identical to $R_2$; and x, y and z which represent molar percents are numbers satisfying the conditions of $5 \leqq x \leqq 99$, $1 \leqq y+z \leqq 95$ and $x+y+z \geqq 90$.

8. The radiographic intensifying screen as claimed in claim 7, in which said linear polyester has a molecular weight in the range of $3 \times 10^3 - 10^4$.

9. The radiographic intensifying screen as claimed in claim 7, in which said binder contains the mixture of (meth)acrylic copolymer and linear polyester in the amount of 75–95% by weight.

10. The radiographic intensifying screen as claimed in claim 7, in which the content of said linear polyester is in the range of 10–40% by weight of the mixture.

* * * * *